Aug. 27, 1957 H. U. HJERMSTAD 2,804,588
POWER SUPPLY APPARATUS
Filed Oct. 3, 1955
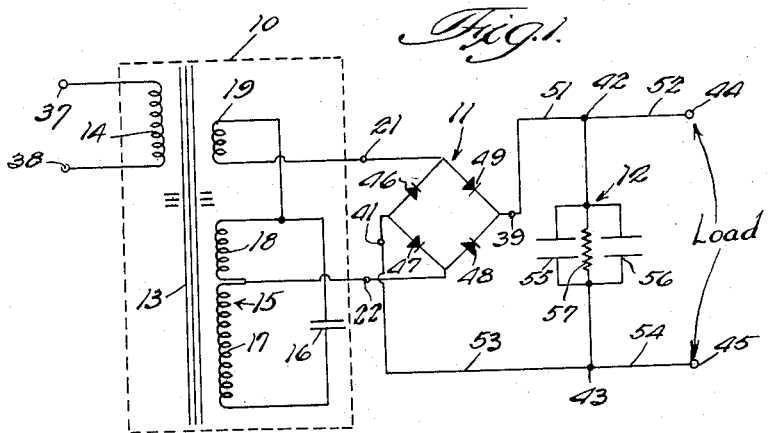
INVENTOR.
Hans U. Hjermstad.
BY
Thiess, Olsen, Mecklenburger,
van Holst, & Coltman.

United States Patent Office 2,804,588
Patented Aug. 27, 1957

2,804,588
POWER SUPPLY APPARATUS

Hans U. Hjermstad, Chicago, Ill., assignor to Sola Electric Co., Chicago, Ill., a corporation of Delaware Application October 3, 1955, Serial No. 538,102

4 Claims. (Cl. 321—16)

This invention relates to power supply apparatus for operation from an alternating current source of predetermined voltage and frequency, more particularly, to D. C. power supply apparatus, and it is an object of this invention to provide improved apparatus of this character.

D. C. power supply apparatus utilizing constant voltage transformers of the type disclosed in the patent to Joseph G. Sola, No. 2,143,745, issued January 10, 1939 has heretofore been provided for operation with relatively constant loads, and such apparatus has functioned reasonably satisfactorily and was not unduly complex. With such prior apparatus the supply voltage could vary over a substantially wide range without affecting the output or D. C. voltage but voltage regulation with changes in load was relatively poor. Other D. C. power supply apparatus has heretofore been suggested in which, to avoid the presence of ripple in the output D. C. voltage, relatively large filter chokes had to be provided thereby resulting in increased cost, weight and size. With such prior apparatus, the desired voltage regulation with changes in load was obtained by the use of relatively complex and expensive regulating and controlling equipment.

Accordingly, it is a further object of the invention to provide D. C. power supply apparatus of the character indicated which will maintain a substantially constant output D. C. voltage irrespective of substantial changes in load and substantial changes in the supply voltage.

It is a further object of the invention to provide D. C. power supply apparatus of the character indicated which will supply an ordinary D. C. load and a transient load of substantial magnitude while still maintaining a relatively constant output voltage irrespective of load or supply voltage changes.

It is a further object of the invention to provide D. C. power supply apparatus of the character indicated which substantially eliminates separate filter chokes and eliminates separate components which protect the rectifiers from overload during starting or transient conditions.

It is a further object of the invention to provide improved apparatus of the character indicated by means of which it is enabled to obtain a substantially square top voltage wave.

It is a further object of the invention to provide improved apparatus which is relatively simple in form, efficient in operation and of reduced size and weight.

Additional objects and advantages of the invention will become apparent as the description proceeds and the invention may be better understood by reference to the accompanying drawings, in which:

Figure 1 is a circuit diagram of apparatus according to the invention;

Fig. 2 is a top view of a high reactance transformer partially in section which forms a part of the apparatus illustrated in Fig. 1.

Fig. 3 is a graph of output voltage vs. D. C. load current for one form of apparatus shown in Fig. 1;

Fig. 4 is a representation of an oscilloscope showing the A. C. voltage in one portion of the circuit of Fig. 1 during operation; and Figs. 5 and 6 are circuit diagrams illustrating series and parallel circuit combinations, respectively, of apparatus shown in Fig. 1.

Referring to the drawing, the invention is shown in Fig. 1 as comprising a constant voltage transformer apparatus 10, rectifying apparatus 11 and a combined filter and transient load supply apparatus 12.

The constant voltage transformer apparatus as shown by the broken line rectangle is of the resonant type disclosed and claimed in the patent to Joseph G. Sola, No. 2,143,745, January 10, 1939 and comprises a core 13 with a primary winding 14 and a secondary winding 15 disposed thereon, a capacitor 16 being connected across the secondary winding. The secondary winding 15 is divided into two parts 17 and 18 of which the part 18 forms a load winding, the number of turns of the winding 15 being selected to provide the desired flux density in the core and to enable an economical size of condenser 16 to be used. A compensating winding 19 is wound closely coupled to primary winding 14 and in such a direction as to oppose voltage increases when the primary voltage increases and is connected in circuit with the load winding portion 18 to form an A. C. output circuit having terminals 21 and 22.

Referring more particularly to Fig. 2, one form of transformer according to the invention is shown. The transformer core has an outer part consisting of side legs 23 and 24 and end legs 25 and 26, which conveniently may be formed in a single piece, as by a stamping operation. Longitudinally and centrally of the outer part of the core is a central member 27 upon which the windings 14 and 15 are disposed. Extending inwardly between windings 14 and 15 are a pair of high reluctance magnetic shunts 28 and 29 which provide high leakage reactance for the secondary winding 15. The shunt 28 comprises an iron portion 31 integral with side leg 23 and a nonmagnetic gap 32. Similarly the high reluctance shunt 29 comprises an iron portion 33 integral with side leg 24 and a nonmagnetic gap 34. While the portions 31 and 33 are shown integral with their corresponding side legs, it will be understood that these shunt members may be separate therefrom, and nonmagnetic gaps may be provided at either or both ends thereof, the dimensions of the gaps, however, being chosen as will be hereinafter described.

A suitable thickness of a stack of laminations for both the outer part of core 13 and the central leg 27 is chosen to give the desired rating of transformer. The assembled stack of laminations forming the central leg 27, as shown, is pressed into suitably formed openings in the end legs 25 and 26, the necessary metallic contact being obtained along the sides of the end portions of central leg 27. Small gaps 35 and 36 are provided at the very ends of central leg 27 so that metallic contact therebetween and the immediately adjacent surfaces of the slots in end legs 25 and 26 is avoided, thereby preventing bowing of the central leg.

The capacitor 16 is chosen in accordance with the principles disclosed in the patent referred to and has a capacitive reactance at the frequency and voltage of the source of alternating current supply connected to terminals 37 and 38 of the primary winding 14 bearing such relationship to the inductive reactance of the transformer and particularly of the secondary winding 15, so as to create a condition of substantially series resonance in the circuit of the secondary winding 15 and the capacitor 16 when the device is in operation. During such operation, because of the resonant effect, the voltage across the capacitor 16, that is to say, the voltage across the secondary winding 15 is substantially greater than the turns ratio voltage. As a result of the resonant effect the flux density in the central leg 27, at least in the part thereof which is disposed inside of the secondary winding, is very high. This flux density in one form of the apparatus according to the invention was approximately 123,000 lines per square inch while the corresponding flux density in that portion of the central leg 27 inside of the primary winding 14 was approximately 92,000 lines per square inch.

To avoid stray field surrounding the exterior of the transformer during operation, the total cross-sectional area of the side legs 23 and 24 is substantially greater than the cross-sectional area of central leg 27. The portions of end legs 25 and 26 on each side of the central leg 27 are of the same cross-sectional area as the side legs. In the particular case illustrated, the total cross-sectional area of the outer legs was approximately 71 percent greater than that of the central leg.

By virtue of the resonant nature of the transformer 10, that is, the high flux density or saturation brought about by the combination of transformer 10 with capacitor 16, a substantially constant A. C. output voltage is obtained at terminals 21 and 22, irrespective of substantial changes in voltage across input terminals 37 and 38, the compensating winding assisting in maintaining the constancy of the voltage output. In the event that relatively slight changes in output voltage can be tolerated, the number of turns in compensating winding 18 may be reduced or it may be possible to eliminate it completely.

Connected to terminals 21 and 22 is a full wave rectifier 11, the rectifier having output terminals 39 and 41 to which are connected the terminals, respectively, 42 and 43 of the filter and transient load supply apparatus 12, the terminals 42 and 43 being, in turn, connected to terminals 44 and 45, respectively, to which the D. C. load may be connected.

It is an important feature of the present invention that the load may be varied in magnitude without substantially affecting the output voltage at terminals 44 and 45. For this, it is essential that the resistance drops throughout the circuit be reduced to a minimum if not eliminated completely. Insofar as the transformer is concerned, relatively large conductors may be used for windings 18 and 19, so that the resistance drop in these windings may be substantially ignored even at relatively low values of output voltage. The rectifier units or cells 46, 47, 48 and 49 of rectifier 11 must also be of very low or substantially negligible voltage drop in the direction of current flow and at the same time must have the ability to withstand high values of peak inverse voltage in order not to break down on the negative half cycle of the alternating voltage. These requirements of rectifier cells have been difficult to obtain, but germanium rectifiers are now available which have a voltage drop per cell of about seven-tenths of a volt and can withstand a peak inverse voltage of 300 volts per cell. Any form of rectifier may, of course, be used and, for some applications having less rigid resistance drop requirements, gas-filled tubes, selenium or silicon rectifiers may serve satisfactorily.

The ordinary or steady state load connected to terminals 44 and 45 is supplied through the rectifier apparatus 11 from terminals 39 and 41 through conductors 51 and 52 and conductors 53 and 54, respectively. The filter and transient load supply apparatus 12 does not enter into the substantially steady state operation. When the resistance drops through the rectifier unit 11 and the windings 18 and 19 of the transformer 10 are reduced to a negligible value, the load may be varied over a wide range without altering substantially the output voltage at terminals 44 and 45. For example, in the unit described, according to the invention, the voltage at terminals 44 and 45 was designed to be 48 bolts at 4 amperes. In this unit the voltage varied from approximately 51 volts at no load or open circuit to 47 volts at 25 percent overload. At steady state loads only slightly larger than 25 percent overload, the voltage at terminals 44 and 45 collapsed rapidly and currents decreased but, at short circuit of terminals 44 and 45, the current was approximately 5 amperes. This characteristic is illustrated in Fig. 3 and provides certain definite advantages to be elaborated subsequently in this specification. For this same unit when the load remained constant at 4 amperes and the primary voltage, i. e., the voltage applied to terminals 37 and 38 was varied from 95 volts to 130 volts, the nominal primary voltage being 115 volts, the load volts at terminals 44 and 45 varied only from 47.2 volts to 48.4 volts.

It is also an important object of the present invention to enable the power supply to deliver a transient load of substantially greater magnitude than the steady state load while supplying the steady state load and without affecting the voltage regulation thereof. For this purpose capacitors 55 and 56, shown connected in parallel and forming part of the transient load supply apparatus 12, are connected across the output of the rectifier unit 11 at terminals 42 and 43. In the unit described, the capacitors 55 and 56 each had a capacity value of 8,000 microfarads, making a total of 16,000 microfarads. A single capacitor of this capacity value could, of course, be used. A resistor 57 of relatively high ohmic value, for example 5,000 ohms, is connected across the capacitors 55 and 56 for enabling the capacitor charge to leak off when the unit is not in use. With 16,000 microfarads, and the circuit as shown, a transient load of 5 amperes in magnitude and of twenty milliseconds duration repeated every two hundred milliseconds was supplied while a steady state load of 3 amperes was also being supplied without noticeably affecting the steady state voltage at terminals 44 and 45. While satisfactory results are obtained with capacity values as indicated it should be understood that this is not by way of limitation, but smaller capacity values may be used depending upon the load conditions to be met. However, the total capacity value must in all events remain large to obtain the desirable results of low ripple in the steady state D. C. voltage and to maintain a substantially square top wave of alternating voltage at terminals 21 and 22 in order to achieve high efficiency of operation of the rectifier unit 11. The manner of achieving this will be elaborated subsequently in this specification.

The presence of the large capacitors 55 and 56 requires that the current, transient as well as steady state, delivered to or taken from the rectifier unit 11 be limited in order to avoid burning out the rectifiers, particularly when the apparatus is started and the capacitors 55 and 56 are uncharged. Capacitors of the magnitude indicated will take an extremely high magnitude of charging current which would burn out the rectifiers unless measures are taken to prevent it. The presence of filter chokes and resistors, for example, while permitting a solution of this problem, would ruin the load voltage regulation, the maintenance of which is an essential object of the invention, apart from the additional cost of such components and the increase in size and weight brought about by their use.

It was found that constant voltage transformer unit 10 could be made according to the invention to provide the current limiting for the recitifier unit 11 under the conditions indicated, thereby permitting the capacitors 55 and 56 to charge effectively and rapidly without injuring the rectifier units. This was achieved by making the nonmagnetic gaps 32 and 34 of the transformer 13 quite small, for example, of the order of .020 inch each. In this manner sufficient inductive reactance is available in the transformer to provide a limited current on a short circuit of a power unit, it being apparent that the uncharged capacitors 55 and 56 are in effect a short circuit upon the rectifier unit 11. As may be observed in Fig. 3, which is a graph of D. C. load volts at terminals 44 and 45 plotted against D. C. amperes on a steady state basis, at zero D. C. volts, i. e., on short circuit, the unit delivers only 5 amperes, which is to say, 25 percent greater than normal current. This magnitude of current the rectifier cells will stand without injury. As the capacitors 55 and 56 develop a charge, the current supplied thereto through the rectifier becomes less and ultimately becomes zero unless a load is being supplied. The presence of small air gaps 32 and 34 does not impair in any way the operation of the transformer 13 as a constant voltage transformer, that is to say, the substantially series resonant effect is still maintained by means of the capacitor 16. As may be seen in Fig. 3, the D. C. voltage at terminals 44 and 45 varies from approximately 51 volts at open circuit to about 48 volts at 4 amperes or normal steady state load. At 5 amperes, a steady state load of 25 percent overload, the D. C. voltage has dropped to approximately 47 volts. For load resistance values decreasing further, such as to increase the load current, the load voltage and current vary, as shown from point A to point B of the graph of Fig. 3. That is to say, load resistance values only slightly less so as to cause a slightly increased current to flow beyond 5 amperes, will cause the load voltage to drop suddenly, and actually less amperes will flow for decreased load resistance values until a minimum current is reached at point C of 4 amperes. Thereafter for still decreasing load resistance values the current increases again until at short circuit the current is 5 amperes which is the same value at which the voltage suddenly starts to decrease. From zero load up to and including 5 amperes of load, the regulation curve is substantially flat.

While the apparatus as described and having the load regulation as shown in Fig. 3 performs satisfactorily, it is not essential that a load regulation, such as shown, be provided. The reverse bend, the portion of the curve ACB, for example, need not be as shown. It is essential that the short circuit current have a value that is safe to pass through the rectifier cells. It has been found satisfactory that this short circuit be of the same general order of magnitude as the full load steady state current. The flat portion of the curve during normal load ranges of the device, as shown in Fig. 3, and the portion of the curve ACB are achieved with the presence of the compensating winding 19. In cases wherein this winding is eliminated a somewhat different regulation curve may be expected although the regulation will be substantially constant throughout the normal load range, and the short circuit current will be within the safe limits. Regular constant voltage transformers of the general character described have large nonmagnetic gaps corresponding to gaps 32 and 34 and, consequently, do not have the sharp cut-off voltage at load values not substantially greater than full load, as exhibited by the unit according to the invention. Achievement of the constant voltage effects, as well as the sharp cut-off for protection of the rectifier units, are obtained without increasing the size of the transformer and without supplying additional units, such as series resistors or filter chokes.

The capacity values of capacitors 55 and 56 are sufficiently large, in effect, to act as storage batteries in supplying transient loads and thus enable the transient load to be supplied without affecting the steady state load. In the unit described the magnitude of ripple in the D. C. voltage was reduced to a point where its maximum value was about four-tenths of 1 percent at full load, at nominal voltage. For lesser values of load the amount of ripple voltage was decreased. The need for filter chokes to reduce ripple was consequently eliminated according to the invention.

In Fig. 4 there is shown a wave shape of alternating voltage as observed in actual operation at terminals 21 and 22, that is, at the input to rectifier unit 11. It will be observed that this voltage wave is essentially flat at the tops of the waves rather than peaked, that is to say, it is substantially a square wave. Because of such a wave shape, the rectifiers may operate at a higher current rating due to the reduced peak voltage applied.

The curve of Fig. 4 was obtained when the unit being described was feeding a steady state load of 4 amperes, the total capacity value of capacitors 55 and 56 being 16,000 microfarads and the supply voltage at terminals 37 and 38 being a sine wave of 115 volts R. M. S. Under these conditions the alternating voltage at terminals 21 and 22 had an R. M. S. value of 43.8 volts and a peak to R. M. S. ratio of about 1.06 and the output voltage at terminals 44 and 45 was 48.0 volts D. C. It was observed that altering the capacity values of capacitors 55 and 56 until the total capacity value was about 2,000 microfarads did not materially change the shape of this curve, with or without load. At capacity values less than about 2,000 microfarads a rounding of the tops of the wave was noticed and for still lesser values of capacity the wave shape became substantially more peaked. For standard constant voltage transformers of the type disclosed in the aforesaid Patent No. 2,143,745 the peak to R .M. S. ratio of the output voltage when the transformer is supplying rated load has a value of about 1.3.

The particular device being described was also operated with the capacitors 55 and 56 removed but the supply voltage remained 115 volts R. M. S. and the ohmic load value remained the same. Under this latter condition, the alternating voltage at terminals 21 and 22 had an R. M. S. value of 43.7 volts, the output voltage at terminals 44 and 45 was 40.8 volts D. C., and the steady state load fed to the load of the same ohmic value was 3.4 amperes. It is to be noted that the R. M S. volts at terminals 21 and 22 differed only slightly, 43.8 as compared with 43.7, while the D. C. output voltage differed substantially, 48 as compared with 40.8, for the two conditions of the total capacity of capacitors 55 and 56 being 16,000 microfarads and zero microfarads, respectively. With a substantially more peaked wave shape applied to the rectifier unit it would be rated at a lower power value, if the current remained the same as previously.

The wave shape of Fig. 4, having a peak to R. M. S. ratio of about 1.06, is considered substantially a square wave, it being understood that a square wave is a wave having a peak to R. M. S. ratio between 1 and a value not substantially greater than 1.15.

With the wave shape of Fig. 4 at terminals 21 and 22 these terminals could be utilized as a source of a square wave shape voltage, should this be desired.

A further advantage of apparatus according to the invention is that two or more units may be connected at their output terminals in series or in parallel as desired in order to achieve any amount of load capacity. For example, in Fig. 5 the terminals 44 and 45 of a unit corresponding to that as shown in Fig. 1 are shown connected to the terminals 44a and 45a of a similar unit to supply a common load 58 in series. Correspondingly in Fig. 6 the terminals 44 and 45 of a unit corresponding to that shown in Fig. 1 are shown connected to terminals 44b and 45b of a similar unit in parallel to supply a common load 59. Ordinary and well understood rules for connecting D. C. sources in series or parallel apply to the instances described.

While the principles of the invention may be applied to apparatus of different ratings and characteristic values, certain of the constants of a particular unit have been given throughout this specification. This is by way of example only and is not intended to be limiting. To complete the constants of the particular unit described it may be noted that the rating of transformer 13 was 260 volt amperes with the primary voltage at terminals 37 and 38 being 115 volts, variations therein from 100 to 130 volts being permissible. The cross-sectional area of the central leg 27 was approximately 2.19 square inches and the cross-sectional area of each of the outer legs 23 and 24 and each of the end legs 25 and 26 was approximately 1.875 square inches. The cross-sectional area of each shunt portion 31 and 33 was approximately 1.1 square inches. The primary winding 14 consisted of 215 turns of No. 15 copper wire; the secondary winding portion 17 consisted of 805 turns of No. 19 copper wire; the load winding portion 18 consisted of 90 turns of No. 13 copper wire; and the compensating winding 19 consisted of 7 turns of No. 13 copper wire. The laminations forming the core were of 24 gage cold-rolled transformer steel. The value capacitor 16 was 4 microfarads.

During operation with 115 volts applied to the primary winding the voltage across capacitor 16 was 638 volts at no load and 610 volts at full load.

Apparatus according to the invention has the additional advantage of improved frequency response as compared with other known apparatus. The particular unit described had a variation of 1.3 percent in output voltage for a one percent change in frequency.

While particular embodiments of the invention have been shown, it will be understood, of course, that the invention is not limited thereto since many modifications may be made, and it is, therefore, contemplated by the appended claims to cover any such modifications as fall within the true spirit and scope of the invention.

The invention having thus been described, what is claimed and desired to be secured by Letters Patent is:

1. D. C. power supply apparatus for operation from a source of predetermined voltage and frequency comprising a high reactance transformer having a core, a primary winding and a secondary winding disposed on said core and a high reluctance magnetic shunt magnetically disposed between said primary and secondary windings, said shunt including a non-magnetic gap, a first capacitor connected across substantially said secondary winding, the value of capacitance of said first capacitor at the voltage and frequency of such source having a relationship to the reactance of said transformer at the same voltage and frequency as to create a substantially series resonant condition in the circuit of said transformer and first capacitor during operation, at least a portion of said secondary winding forming a load winding, rectifier means of low internal resistance having input terminals connected to said load winding and having output terminals, a second capacitor connected across said output terminals, said air gap having a value such that said transformer provides a reactance for limiting the charging current of said load winding to said second capacitor, the capacity value of said second capacitor being such that the input voltage to said rectifier means becomes a substantially square wave, and load terminals connected to the terminals of said second capacitor.

2. D. C. power supply apparatus for operation from a source of predetermined voltage and frequency comprising a high reactance transformer having a core, a primary winding and a secondary winding disposed on said core and a high reluctance magnetic shunt magnetically disposed between said primary and secondary windings, said shunt including a non-magnetic gap, a first capacitor connected across substantially said secondary winding, the value of capacitance of said capacitor at the voltage and frequency of such source having such a relationship to the reactance of said transformer at the same voltage and frequency as to create a substantially series resonant condition in the circuit of said transformer and capacitor during operation, at least a portion of said secondary winding forming a load winding, rectifier means of low internal resistance having input terminals connected to said load winding and having output terminals, a second capacitor of high capacity value connected across said output terminals, said air gap having a value such that said transformer provides a reactance for limiting the charging current of said load winding to said second capacitor, a compensating winding closely coupled to said primary winding and connected in circuit with said load winding, and load terminals connected to the terminals of said second capacitor.

3. Power supply apparatus for operation from a source of predetermined voltage and frequency comprising a high reactance transformer having a core, a primary winding and a secondary winding disposed on said core and a high reluctance magnetic shunt magnetically disposed between said primary and secondary windings, said shunt including a non-magnetic gap, a first capacitor connected across substantially said secondary winding, the value of capacitance of said capacitor at the voltage and frequency of such source having such a relationship to the reactance of said transformer at the same voltage and frequency as to create a substantially series resonant condition in the circuit of said transformer and capacitor during operation, at least a portion of said secondary winding forming a load winding, rectifier means of low internal resistance having input terminals connected to said load winding and having output terminals, and a second capacitor connected across said output terminals, said air gap having a value such that said transformer provides a reactance for limiting the charging current of said load winding to said second capacitor, the capacity value of said second capacitor being such that the input voltage to said rectifier means becomes a substantially square wave.

4. D. C. power supply apparatus for operation from a source of predetermined voltage and frequency comprising a high reactance transformer having a core, a primary winding and a secondary winding including load winding means disposed on said core and a high reluctance magnetic shunt magnetically disposed between said primary and secondary windings, said shunt including a nonmagnetic gap, a first capacitor connected across substantially said secondary winding, the value of capacitance of said first capacitor at the voltage and frequency of such source having such a relationship to the reactance of said transformer at the same voltage and frequency as to create a substantially series resonant condition in the circuit of said transformer and first capacitor during operation, rectifier means of low internal resistance having input terminals connected to said load winding means and having output terminals, a second capacitor connected across said output terminals, said air gap having a value such that said transformer provides a reactance for limiting the charging current of said load winding to said second capacitor, the capacity value of said second capacitor being such that the input voltage to said rectifier means becomes a substantially square wave, and load terminals connected to the terminals of said second capacitor.

References Cited in the file of this patent

UNITED STATES PATENTS

| | | |
|---|---|---|
| 2,304,044 | Whittle | Dec. 1, 1942 |
| 2,615,964 | Hubertz | Oct. 28, 1952 |

FOREIGN PATENTS

| | | |
|---|---|---|
| 470,351 | Great Britain | Aug. 13, 1937 |